US00RE50755E

(19) United States
(12) Reissued Patent
Kim et al.

(10) Patent Number: US RE50,755 E
(45) Date of Reissued Patent: Jan. 20, 2026

(54) FABRIC TREATING APPARATUS

(71) Applicant: LG ELECTRONICS INC., Seoul (KR)

(72) Inventors: Sung Min Kim, Seoul (KR); Sog Kie Hong, Seoul (KR); Dong Won Kim, Seoul (KR); Jong Seok Kim, Seoul (KR); Dae Yun Park, Seoul (KR); Hea Kyung Yoo, Seoul (KR)

(73) Assignee: LG ELECTRONICS INC., Seoul (KR)

(21) Appl. No.: 17/506,381

(22) Filed: Oct. 20, 2021

Related U.S. Patent Documents

Reissue of:
(64) Patent No.: 8,296,967
Issued: Oct. 30, 2012
Appl. No.: 12/654,046
Filed: Dec. 8, 2009

(30) Foreign Application Priority Data

Dec. 9, 2008 (KR) ..... 10-2008-0124854
Dec. 9, 2008 (KR) ..... 10-2008-0124855

(51) Int. Cl.
*F26B 11/12* (2006.01)
*D06F 58/12* (2006.01)
*D06F 58/20* (2006.01)

(52) U.S. Cl.
CPC ..... *F26B 11/12* (2013.01); *D06F 58/12* (2013.01); *D06F 58/20* (2013.01)

(58) Field of Classification Search
CPC ..... D06F 58/12; D06F 58/20; F26B 11/12
USPC ..... 34/90, 164, 201, 210, 601; 68/5 D, 5 R; D32/60; 38/14
See application file for complete search history.

(56) References Cited

U.S. PATENT DOCUMENTS 1,602,315 A 10/1926 Wood
3,114,919 A * 12/1963 Kenreich ..... 8/147
3,256,617 A * 6/1966 Konstandt ..... 34/661
3,739,496 A * 6/1973 Buckley et al. ..... 34/210
4,304,053 A * 12/1981 Kellerhals et al. ..... 34/621
5,600,975 A * 2/1997 McClain et al. ..... 68/5 C
6,189,346 B1 2/2001 Chen et al.
(Continued)

FOREIGN PATENT DOCUMENTS

GB 1347800 2/1974
GB 1 414 041 11/1975
(Continued)

OTHER PUBLICATIONS

Definitoin of groove (Year: 2025).*
(Continued)

*Primary Examiner* — Terrence R Till
(74) *Attorney, Agent, or Firm* — KED & ASSOCIATES, LLP

(57) ABSTRACT

A present invention relates to a fabric treating apparatus including an inside cabinet which forms a treating chamber which the fabrics treated in, and a heating unit for supplying any one between hot wind and steam to the treating chamber, and a hanger rack disposed in the treating chamber, and a driving unit for generating rotary power outside the treating chamber and is disposed upper part of the inside cabinet, and a transmission unit for reciprocating the hanger rack by transmitting the rotary power of the driving unit.

36 Claims, 10 Drawing Sheets

(AMENDED)

(AMENDED)

(56) References Cited

U.S. PATENT DOCUMENTS

| | | | | |
|---|---|---|---|---|
| 7,103,996 | B2 * | 9/2006 | Hapke | D06F 73/02 38/14 |
| 7,137,211 | B2 * | 11/2006 | Johnson et al. | 34/381 |
| 9,010,158 | B2 * | 4/2015 | Yoo | D06F 58/10 68/5 R |
| 2005/0223502 | A1 * | 10/2005 | Kleker | D06F 17/04 68/5 R |
| 2006/0037209 | A1 * | 2/2006 | Johnson | D06F 73/02 34/90 |
| 2010/0043247 | A1 * | 2/2010 | Park | D06F 58/12 34/239 |
| 2010/0146805 | A1 * | 6/2010 | Kim et al. | 34/201 |
| 2010/0180645 | A1 * | 7/2010 | Kim | D06F 73/02 68/5 C |
| 2011/0225857 | A1 * | 9/2011 | Kim | D06F 58/12 38/3 |
| 2011/0271545 | A1 * | 11/2011 | Moon | D06F 58/10 34/218 |
| 2012/0017654 | A1 * | 1/2012 | Park | D06F 73/02 68/5 C |
| 2012/0096734 | A1 * | 4/2012 | Moon | D06F 58/20 34/218 |
| 2012/0240425 | A1 * | 9/2012 | Park | D06F 58/20 68/6 |
| 2012/0240427 | A1 * | 9/2012 | Park | D06F 73/02 34/381 |

FOREIGN PATENT DOCUMENTS

| | | |
|---|---|---|
| JP | H5-39498 | 5/1993 |
| JP | 06-339598 | 12/1994 |
| JP | 2000-037598 | 2/2000 |
| JP | 2006-130157 | 5/2006 |
| KR | 10-2002-0096676 | 12/2002 |
| KR | 10-052440 | 10/2005 |
| KR | 10-052440 B1 | 10/2005 |
| KR | 10-2008-0098860 | 11/2008 |

OTHER PUBLICATIONS

Definition of inclination (Year: 225).*

Definition of inclined (Year: 2025).*

Definition of oblong (Year: 2025).*

Definition of slot (Year: 2025).*

U.S. Office Action dated Apr. 11, 2012 issued in U.S. Appl. No. 12/654,046.

* cited by examiner

FIG. 1 (AMENDED)
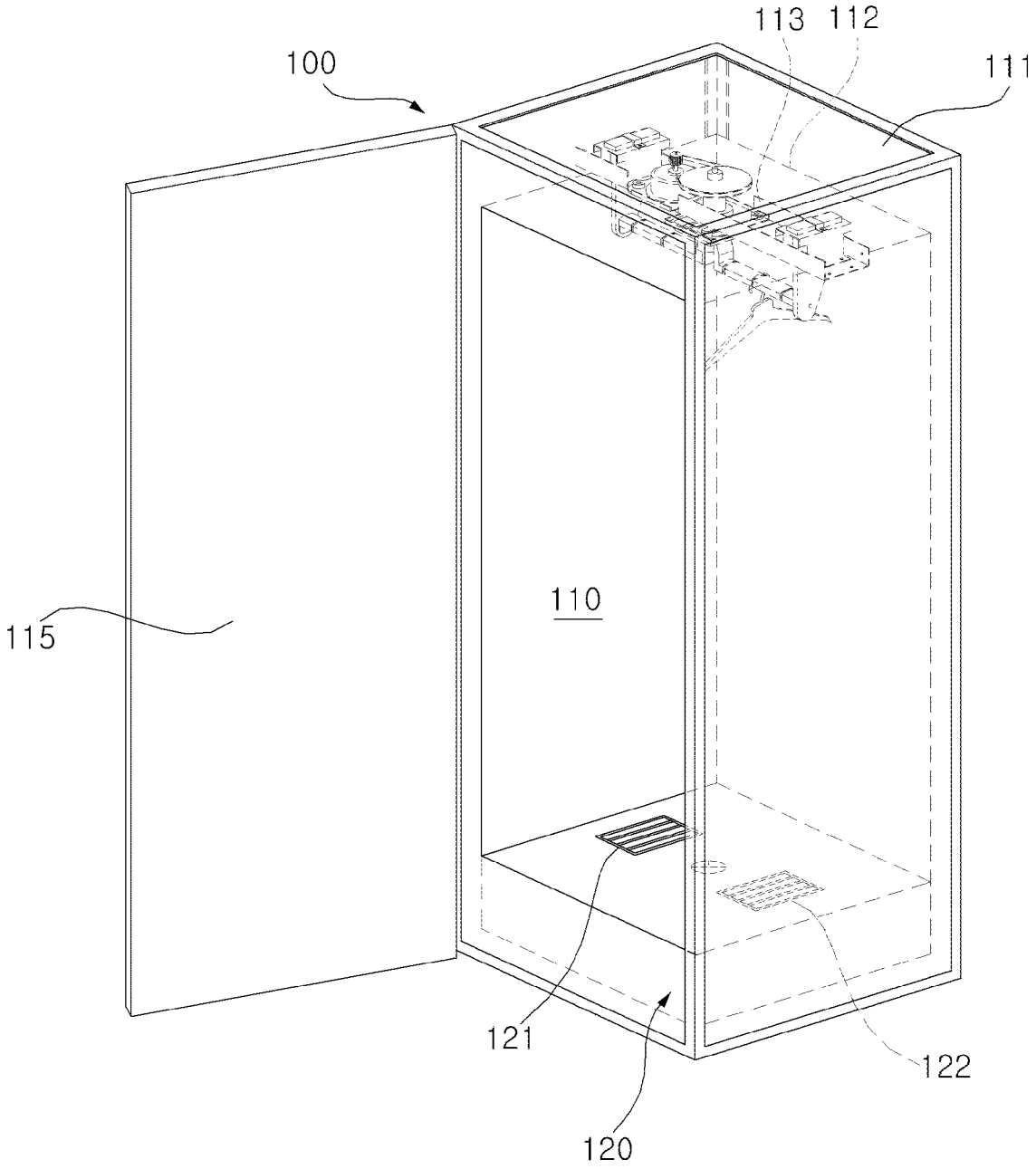

FIG. 3 (AMENDED)
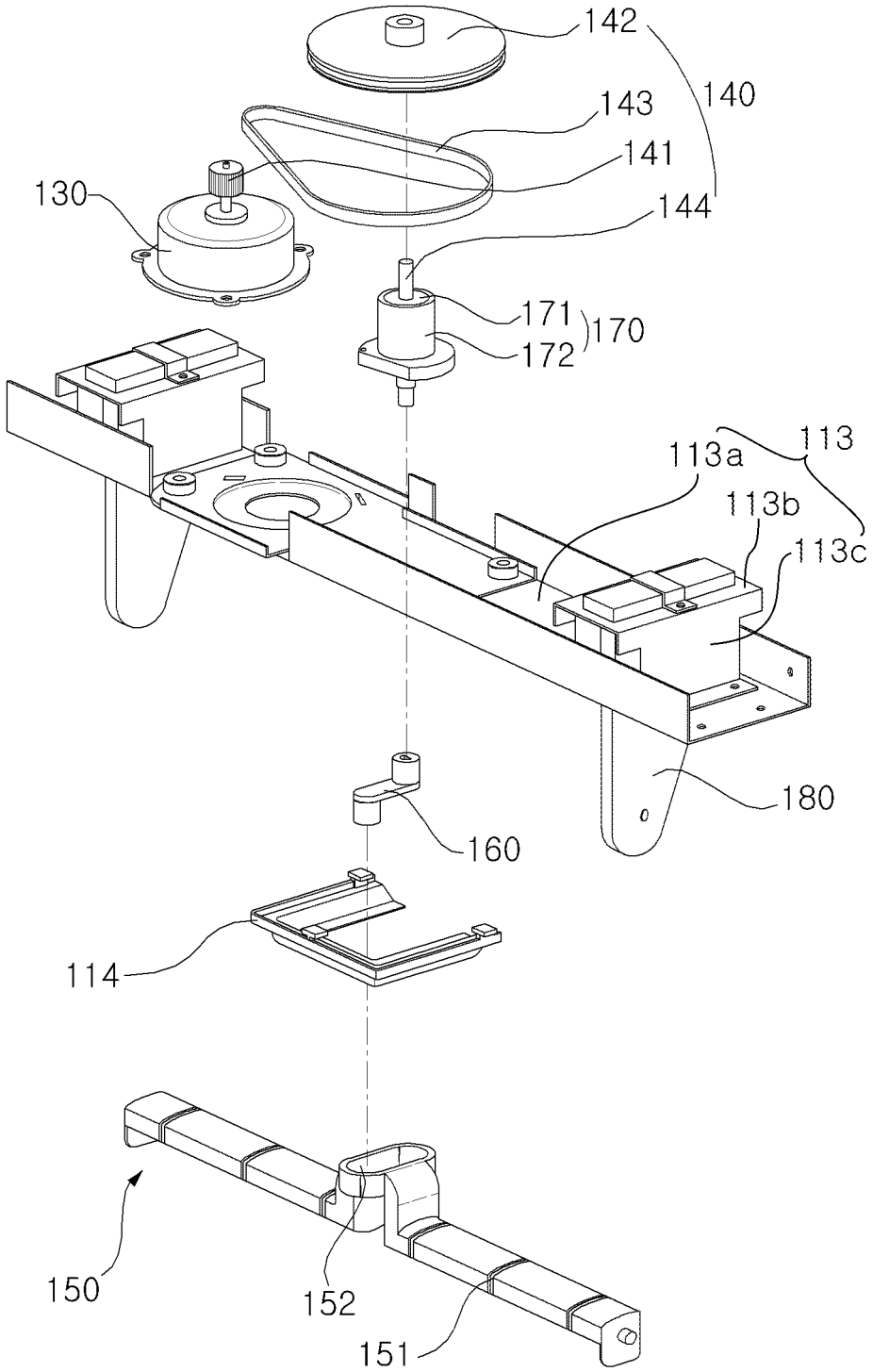

FIG. 9 (AMENDED)
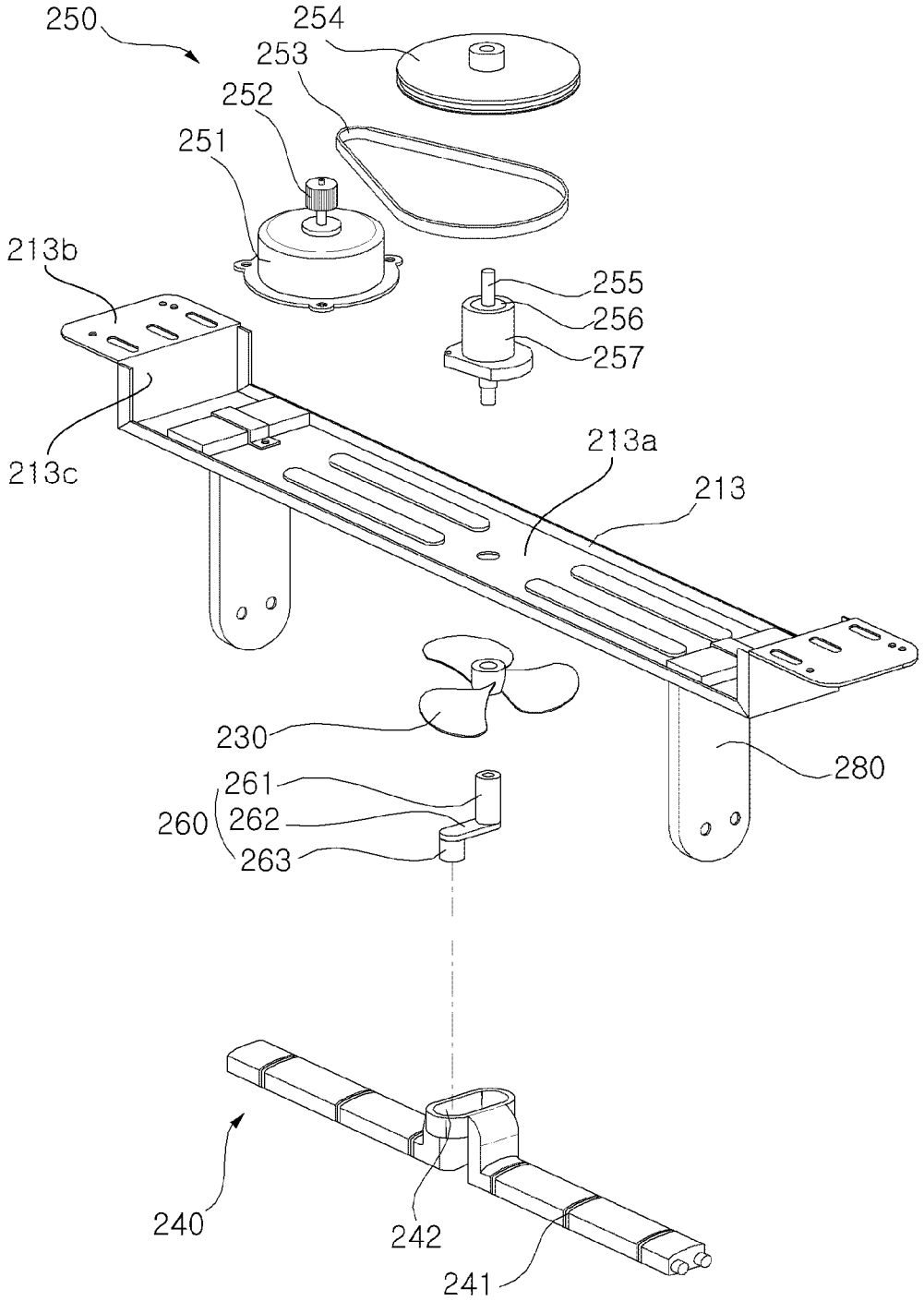

FABRIC TREATING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application] *This application is a Reissue of U.S. Pat. No. 8,296,967, which* claims priority from Korean Patent Application No. 10-2008-0124854 filed on Dec. 9, 2008, and Korean Patent Application No. 10-2008-0124855 filed on Dec. 9, 2008 in the Korean Intellectual Property Office, the disclosure of which is incorporated herein by reference in its entirety.

BACKGROUND OF THE INVENTION

1. Field of the Invention

The present invention relates to fabric treating apparatus including a driving unit is disposed upper part of the outside of a treating chamber.

2. Background of the Invention

A fabric treating apparatus includes all devices for treating fabrics by various methods. The methods include functions of drying fabrics using hot wind. The methods include functions of removing the wrinkles from the fabrics or sterilizing the fabrics or removing a bad smell from the fabrics or supplying aroma to the fabrics or preventing generation of static electricity using a steam and the hot wind.

The conventional fabric apparatus has problems that the space efficiency of the treating chamber is low because the hanger rack is disposed to be moved inside of the treating room and the driving unit for moving the hanger rack is disposed inside or side of the treating chamber.

Particularly, a fabric treating apparatus which the driving unit is disposed side of the treating chamber has a problem that unnecessary space is needed to install the apparatus indoor because the width of the apparatus is larger.

The conventional fabric treating apparatus has a problem that the efficiency for drying fabrics and the treating apparatus is low because the hot wind and the steam may not flow uniformly in the treating chamber. Particularly, as the humid air in the treating chamber is condensed and left on the inner wall of the treating chamber, the apparatus has bad smell and is unsanitary. It has a problem that the fabrics are wet again because the condensed water on inner wall of the treating chamber drops to the fabrics which is finished drying.

BRIEF SUMMARY OF THE INVENTION

An object of the present invention is to provide a fabric treating apparatus and method for improving space efficiency of a treating chamber by disposing a driving unit to the upper part of the outside of a treating chamber An object of the present invention is to provide a fabric treating apparatus and method for minimizing the install space by reducing the width of the apparatus.

An object of the present invention is to provide a fabric treating apparatus and method for improving the dry efficiency by including a fan to circulate the air in the treating chamber.

An object of the present invention is to provide a fabric treating apparatus and method that extra driving unit for rotating the fan does not need, as the fan is rotated by the driving unit which reciprocates the hanger rack disposed in the treating chamber.

An object of the present invention is to provide a fabric treating apparatus and method for making uniform air flow inside of the treating chamber by circulating air in the treating chamber.

An object of the present invention is not restricted by the above objects. The other objects which are not referred to the above will be understood by those of ordinary skill in the art that various changes in form and details may be made therein without departing from the spirit and scope of the present invention as defined by the following.

The present invention provides a fabric treating apparatus including an inside cabinet which forms a treating chamber which the fabrics treated in, a heating unit for supplying any one between hot wind and steam to the treating chamber, a hanger rack disposed in the treating chamber, a driving unit for generating rotary power outside the treating chamber and is disposed upper part of the inside cabinet, and a transmission unit for reciprocating the hanger rack by transmitting the rotary power of the driving unit.

The transmission unit may be disposed to penetrate the inside cabinet. Also the transmission unit may include a power transmission unit which transmits the rotary power of the driving unit and a power transformation unit which reciprocates the hanger rack by converting the rotary power of the transmission unit. The hanger rack may include the slot inserting the end of the power transformation unit.

The power transmission unit may includes a rotary shaft which penetrates the inside cabinet. And the power transformation unit may include a rotary shaft connector which is connected to the rotary shaft, a rotary arm which is formed by extension from the rotary shaft connector and a slot connector which is formed to be projected to the end of the rotary arm and rotates on the rotary shaft and is inserted to the slot which is formed long in perpendicular to the moving direction of the hanger rack.

The slot connector may include a projection which is formed to the rotary arm, and a shock absorber that the projection is inserted. The shock absorber may be an elastic material. Also the slot connector may further include a second bearing which is located between the projection and the shock absorber.

The power transmission may includes a driving pulley which is rotated by the driving unit, a driven pulley which is coupled to the driving pulley, a belt which connects the driving pulley and the driven pulley and a rotary shaft which is rotated by the driven pulley. The diameter of the driven pulley may be larger than the diameter of the driving pulley.

The fabrics treating apparatus may further include a supporter which supports the hanger rack, and the supporter may include an elastic materials. The supporter may be a long plate which is formed to the direction of back and forth to limit the reciprocating motion of the hanger rack from front to back.

Also the fabric treating apparatus may further include a fan which is rotated by the driving unit and circulates air in the treating chamber. The fan may send air to the side direction. The fan may make uniform air flow inside of the treating chamber by circulating air in the treating chamber. The fan may be connected either the power transmission unit or the power transformation unit.

The present invention provides a fabric treating apparatus including a cabinet which forms a treating chamber which a fabric are treated in, a heating unit for supplying any one between hot wind and steam to the treating chamber, a hanger rack disposed in the treating chamber, a driving unit for generating rotary power disposed upper part of the cabinet and a transmission unit which connects the driving unit and the hanger rack by penetrating the cabinet.

The transmission unit may reciprocate the hanger rack by converting the rotary power of the driving unit. The transmission unit may include a power transmission unit which transmits the rotary power by connecting to the driving unit, and a power transformation unit which connects the power transmission unit and the hanger rack and converts the rotary power of the power transmission unit.

BRIEF DESCRIPTION OF THE DRAWINGS

FIG. 1 illustrates a perspective view of a fabric treating apparatus in accordance with an exemplary embodiment of the present invention.

FIG. 3 illustrates a disassembled perspective view of FIG. 2.

FIG. 9 illustrates an exploded perspective view of main part of a fabric treating apparatus according to an exemplary embodiment of the present invention.

DETAILED DESCRIPTION OF THE INVENTION

The above and other advantages of the present invention will become more apparent by describing in detail embodiments thereof with reference to the attached drawings in which.

The present invention is not restricted by the following embodiments. It will be understood by those of ordinary skill in the art that various changes in form and details may be made therein without departing from the spirit and scope of the present invention as defined by the following claims.

Figure 2:
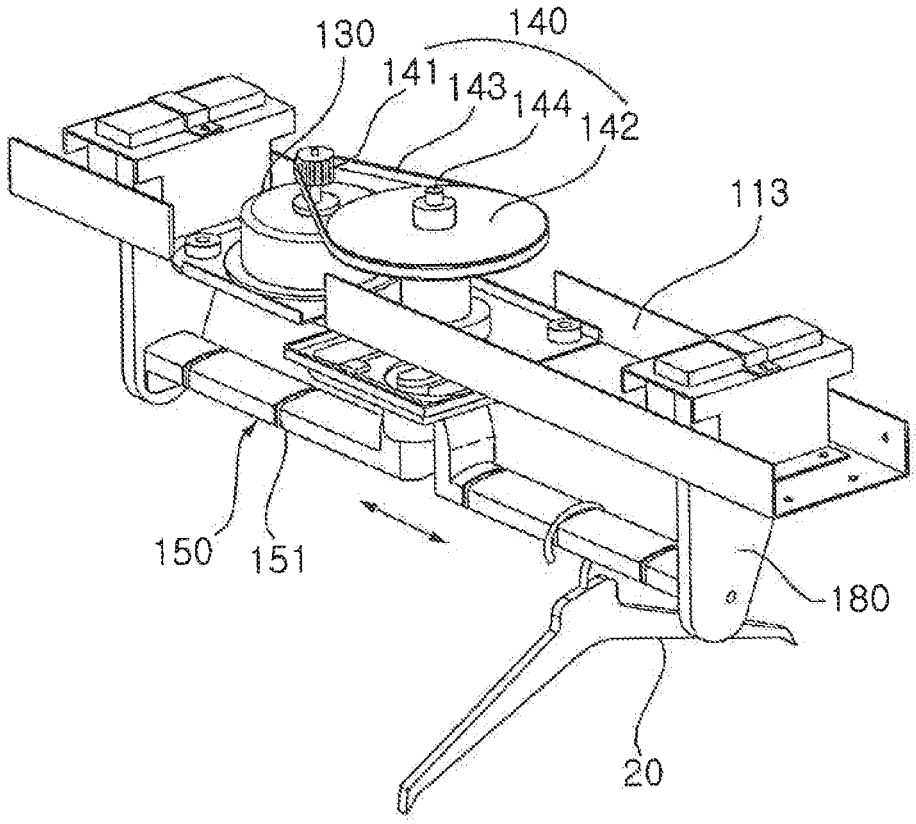
FIG. 2 illustrates a partial enlarged perspective view of FIG. 1.
Figure 4:
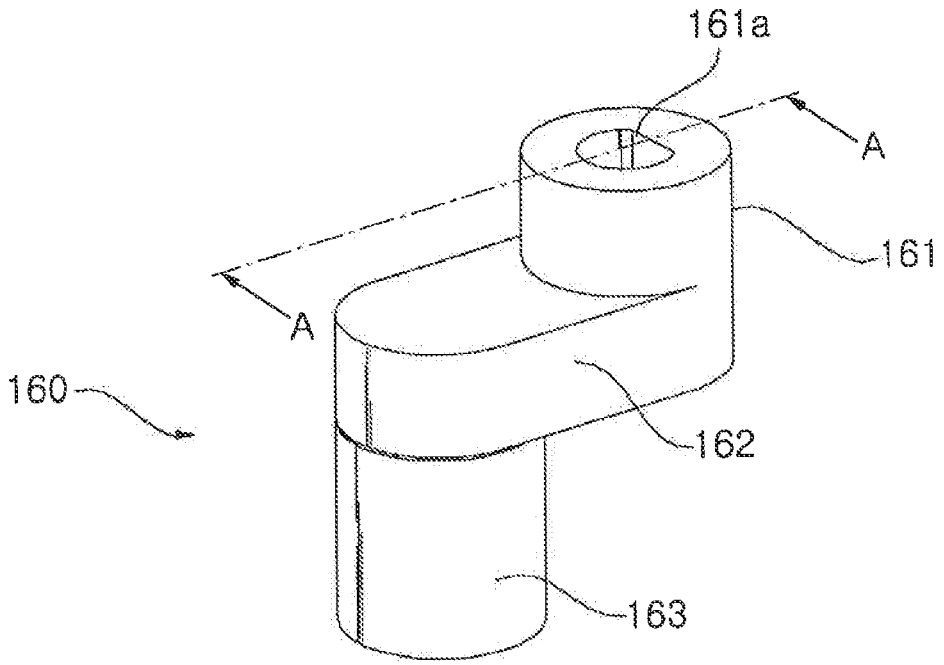
FIG. 4 illustrates a perspective view of a power transformation unit shown in FIG. 3.

FIG. 1 illustrates a perspective view of a fabric treating apparatus 100 in accordance with an exemplary embodiment of the present invention. FIG. 2 illustrates a partial enlarged perspective view of main part of main part of a fabric treating apparatus 100 shown in FIG. 1. FIG. 3 illustrates a disassembled perspective view of FIG. 2. FIG. 4 illustrates a perspective view of a power transformation unit shown in FIG. 3.

A fabric treating apparatus 100 includes an outside cabinet 111 which forms the exterior of the apparatus and an inside cabinet 112 which is disposed in the outside cabinet 111. A treating chamber 110 is disposed in the inside cabinet 112.

The treating chamber 110 has an opening at the side, and thus, a fabric may be loaded in the treating chamber 110 through the opening. The opening side is opened by a door 115. If the door 115 is closed, the treating chamber 110 is isolated from the outside. If the door 115 is opened, the treating chamber 110 is exposed to the outside.

The treating chamber 110 is a space for treating a fabric to be changed the physical or chemical properties of the fabrics by supplying a steam or hot wind. Namely, the treating chamber 110 is a space for treating the fabrics by using different method. For example, in the treating chamber 110, the fabrics may be dried by using a hot wind, or the wrinkles of the fabrics may be removed by using a steam, or the fabrics can be supplied aroma by spraying an aromatic, or the generation of static electricity of the fabrics may be prevented by spraying an antistatic.

The fabric treating apparatus 100 includes a heating unit 120 for supplying any one between hot wind and steam to the treating chamber 110, a hanger rack 150 disposed in the treating chamber 110, a driving unit 130 which is disposed upper part of the inside cabinet 112 for generating rotary power outside the treating chamber 110, and a transmission unit for reciprocating the hanger rack 150 by transmitting the rotary power of the driving unit 130. Also the transmission unit includes a power transmission unit 140 which transmits the rotary power of the driving unit 130 and a power transformation unit 160 which reciprocates the hanger rack 150 by converting the rotary power of the transmission unit.

The transmission unit may be disposed to penetrate the inside cabinet 112 because the transmission unit should reciprocate the hanger rack 150 by transmitting the rotary power generated by the driving unit 130 outside of the treating chamber 110 to inside of the treating chamber 110.

Therefore any one between a power transmission unit 140 and a power transformation unit 160 which is included the transmission unit is disposed to penetrate the inside cabinet 112.

A heating unit 120 is disposed the bottom of the treating chamber 110. More specifically, the heating unit 120 is disposed between the outside cabinet 111 and the inside cabinet 112. The heating unit 120 is able to heat the air inhaled from the treating chamber 110, and to supply the hot wind to the inside of the treating chamber 110. Also, the heating unit is able to generate a steam by heating the water, and to supply the steam to the inside of the treating chamber 110. Of course, the heating unit 120 is able to supply both the hot wind and the steam. Also, the heating unit 120 is able to supply any one between the hot wind and the steam. The heating unit 120 is variously embodied by those of ordinary skill in the scope of the present invention.

The heating unit 120 in accordance with an exemplary embodiment of the present invention includes an air inlet 121 for inhaling the air from the inside of the treating chamber 110, and a heater for heating the air inhaled, and an outlet 122 for discharging the hot wind heated by the heater to the inside of the treating chamber 110, and an injection nozzle for injecting a steam to the inside of the treating chamber 110.

The hot wind or the steam generated by the heating unit 120 supplies to the fabrics loaded in the treating chamber 110, and has an influence on the physical property or the chemical property of the fabrics. Namely, the hot wind or the steam makes the structure of the fabrics to be relaxed, so that the wrinkles of the fabrics may be removed. The steam reacts to the smell particles of the fabrics, so that an unpleasant smell may be removed. Also, the hot wind or the steam generated by the heating unit 120 has a sterilization effect on bacteria of the fabrics.

The driving unit 130 is disposed the upper part of the outside of the treating chamber 110. The driving unit 130 is disposed between the inside cabinet 112 and the outside cabinet 111. The driving unit 130 may be embodied by a motor generating rotary power. The driving unit 130 may be built in motor frame 113 fixed between the inside cabinet 112 and the outside cabinet 111. The motor frame 113 fixes the driving unit 130 and absorbs the vibrations generated by the driving of the motor 130.

Large amount of fabrics may be treated by making enough space because the driving unit 130 is disposed outside of the treating chamber 110. Also if the driving unit 130 is disposed side of the treating chamber, the width of the fabrics treating apparatus is extended, thus the fabrics treating apparatus 120 of the present invention has an advantage to have slim shape by disposing upper part of the inside cabinet 120. The fabrics treating apparatus 120 may be easily installed at the narrow space such as indoor by the slim shape. Also there is an advantage to increase the amount of the fabrics to treat by the enlargement of the inner space of the treating chamber 110 because of installing the driving unit 130 by using the upper part of the outside of the treating chamber 110.

The power transmission unit 140 transmits the rotatory power generated by the motor to the power transformation unit 160. The power transmission unit 140 transmits a rotary motion of the one unit to another unit. The power transmission unit 140 is variously embodied by those of ordinary skill in the scope of the present invention.

The power transmission unit 140 includes a driving pulley 141 rotating by the motor 130, and a driven pulley 142 rotated by a belt which connects the driving pulley 140 and the driven pulley 142, and a rotary shaft 144 inserted into the driven pulley 142 and rotated by the driven pulley 142.

According to an exemplary embodiment, the diameter of the driven pulley 142 is larger than the diameter of the driving pulley 141. The driving pulley 141 rotates with comparatively high speed. If the hanger rack 150 reciprocates same cycle with the rotation cycle generated by the driving unit 130, transient vibration is generated and the driving unit 130 is overloaded, and the efficiency of the hanger rack 150 for treating fabrics is decreased. Therefore, it is desirable to control the reciprocating cycle of the hanger rack 150, through the diameter of the driven pulley 142 is larger than the diameter of the driving pulley 141. The adequate range of the diameter ratio between the driving pulley 141 and the driven pulley 142 is from 1:15 to 1:5.

The power transmission unit 140 may include a driving sprocket, a driven sprocket, and a chain, instead of said driving pulley 141, said driven pulley 142 and said belt 143. And besides, the power transmission unit 140 may includes a driving gear, a driven gear, a belt, and so on. Thus, the power transmission unit 140 may be variously embodied.

Also, the fabric treating apparatus 100 may further include a bearing unit which is inserted into the rotary shaft 144. The bearing unit 170 may include the bearing housing 172, and a first bearing 171 which is disposed between the rotary shaft 144 and the inside of the bearing housing 172. The bearing unit 170 supports the rotary shaft 144 by being fixed at a motor frame 113, and makes the rotary shaft 144 rotate smoothly. It is desirable for the first bearing 171 to be an oilless bearing so as not to pollute the fabrics in the treating chamber 110.

The power transformation unit 160 transforms rotary motion received from the power transmission unit 140 into reciprocating motion of the hanger rack 150. The power transformation unit 160 includes a rotary shaft connector 161 which is connected to the rotary shaft 144 of the power transmission unit 140, a rotary arm which is extended from the rotary shaft connector 161, and a slot connector 163 which is inserted to the slot 152 of the hanger rack 150 and rotates the rotary shaft 144 as projected from the end of the rotary arm 162.

The rotary shaft axis [151] is disposed at the end of the power transformation unit 160, and an insert hole 161a in which the rotary shaft 144 is inserted. It is desirable for the rotary arm 162 to be extended through the perpendicular direction with the rotary shaft 144 at the rotary shaft connector 161. The slot connector 163 is extended downward from the end of the rotary arm 162. The slot connector 163 rotates with fixed radius from the rotary shaft 144 as the rotary shaft 144 rotates. If the rotary arm 162 is disposed perpendicular to the rotary shaft 144, the fixed radius would be the length of the rotary arm 162. Refer to the detailed construction of the slot connector 163 for further details.

The hanger rack 150 may include a hanger slot 151 on which a hanger [200] *20* is hung, and a slot 152 which is disposed at the middle. The hanger rack 150 reciprocates with being hung on the upper part of the treating chamber 110. Both sides of the hanger rack 150 may be connected to the inner cabinet 112 which constitutes the upper face of the treating chamber or to the motor frame 113 by each supporter 180.

*Based on ordinary meaning of the term "slot", the slot may be provided by an opening* (*opened top and bottom*) *or a groove* (*opened top and a closed bottom*). It is desirable for *an opened top of* the slot 152 to be disposed long with the perpendicular direction to the moving direction of the hanger rack 150 *such that the slot 152 has an oblong shape*. As the reciprocating direction of the hanger rack 150 is the right and left direction, it is explained that the slot is disposed long with the back and forth direction to the following. As the slot 152 is disposed long with the back and forth direction, the movement with back and forth direction is counterbalanced by the slot 152 and the hanger rack 150 reciprocates to the right and left direction, when the slot connector 163 rotates the rotary shaft 144 with being inserted into the slot 152 movement. *The slot connector 163 follows along a side surface of the slot 152.*

It is possible for the hanger rack 150 to include a guide instead of the slot 152. It is possible for the guide to make the hanger rack 150 reciprocate by the pushing and pulling force of the power transformation unit 160, as the guide which is made of the rib or the projection differently with an exemplar embodiment of the present invention.

The water may be collected into the slot 152, as the moisture of the humid air in the treating chamber 110 is condensed. Therefore it is desirable for the drain hole (not shown) to be disposed at the slot 152 for the collected water to drain outside the slot 152.

The supporter 180 includes an elastic material for the hanger rack 150 so as to reciprocate. Specially, the supporter 180 is a long plate which is formed to the direction of back and forth to limit the reciprocating motion of the hanger rack from front to back. One end of the supporter 180 is fixed at the motor frame 113 (*including a plate 113a and a ledge 113b provided by an inverted U shaped portion 113c*) *where the driving unit 130 is fixed to the plate 113a and the supporter 180 is coupled to the ledge 113b* or the inner cabinet 112, and another end is combined to the one side of the hanger rack 150. *The supporter 180 connects the hanger rack 150 and the frame 113 and the supporter 180 extends below the ledge 113b and the plate 113a. As shown in FIG. 1, the frame 113 extends along a width direction of the inside cabinet 112.*

A cover 114 may be disposed between the inside cabinet 112 and the hanger rack 150 to hide the power transformation unit 160 so as not to be shown outside.

When the treating room 110 is opened, it has an effect on improving the aesthetics of the apparatus and giving a feeling of the high class apparatus for unnecessary structures such as the power transformation unit 160 not to be shown to users.

The cover 114 is a separated component from the hanger rack 150 according to an exemplary embodiment of the present invention, but the cover 114 may be disposed in one united body with the slot 151 and the hanger rack 150.

Figure 5:
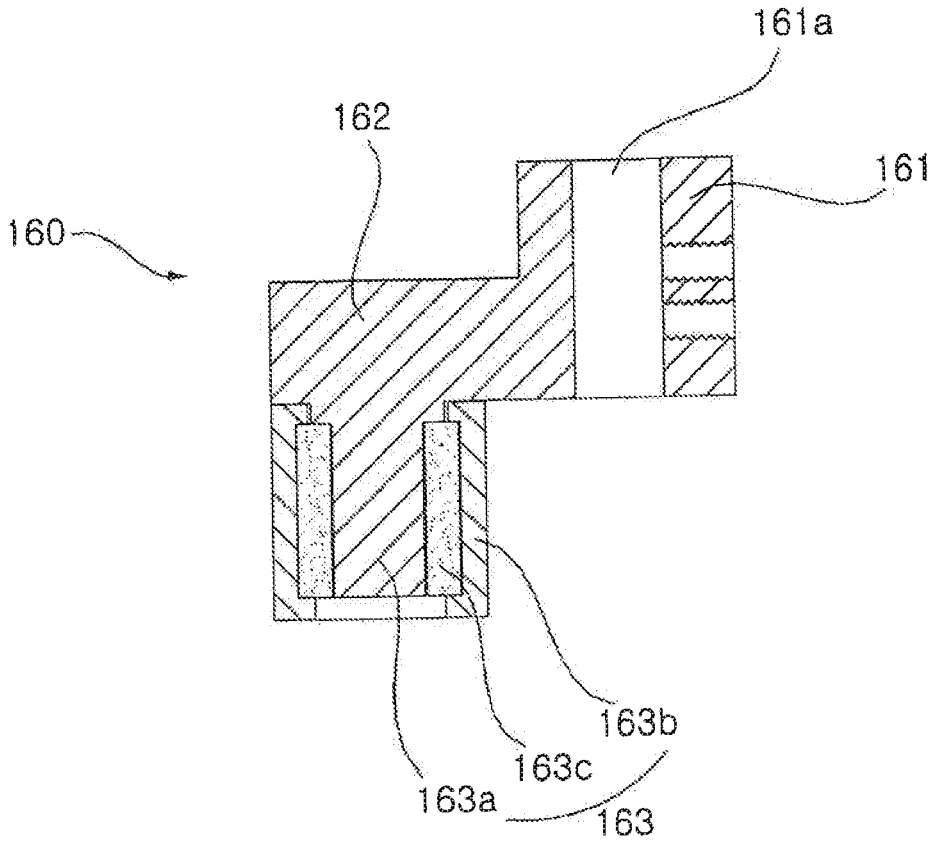
FIG. 5 illustrates a cross-sectional view of a power transformation unit according to A-A line shown in FIG. 4.

FIG. 5 illustrates a cross-sectional view of according to A-A line shown in FIG. 4.

Refer to FIG. 5, the slot connector 163 of the power transformation unit 160 includes a projection 163a which is formed at the rotary arm 162, a shock absorber 163b that the projection is inserted, and a second bearing 163c which is located between the projection 163a and the shock absorber 163b.

The shock absorber 163b removes the impact sound generated between the power transformation unit 160 and the slot 152. For the power transformation unit 160 moves smoothly with being inserted to the slot 152, there should be a prescribed space between the outside surface of the shock absorber 163b and the inside surface of the slot 152. The shock absorber 163b which made from the elastic material such as the rubber contacts elastic with the inside surface of the slot 152 when the hanger rack 150 reciprocates. The shock absorber 163b makes the hanger rack 150 reciprocates smoothly by making the space between the power transformation unit 160 and the slot 152.

The shock absorber 163b may be coated in PTFE (Poly Tetre Fluloro Ethylene) in order to reduce the friction with the inside surface of the slot 152. PTFE has the excellent performances on the lubrication and the abrasion resistance to the friction.

Figure 6:
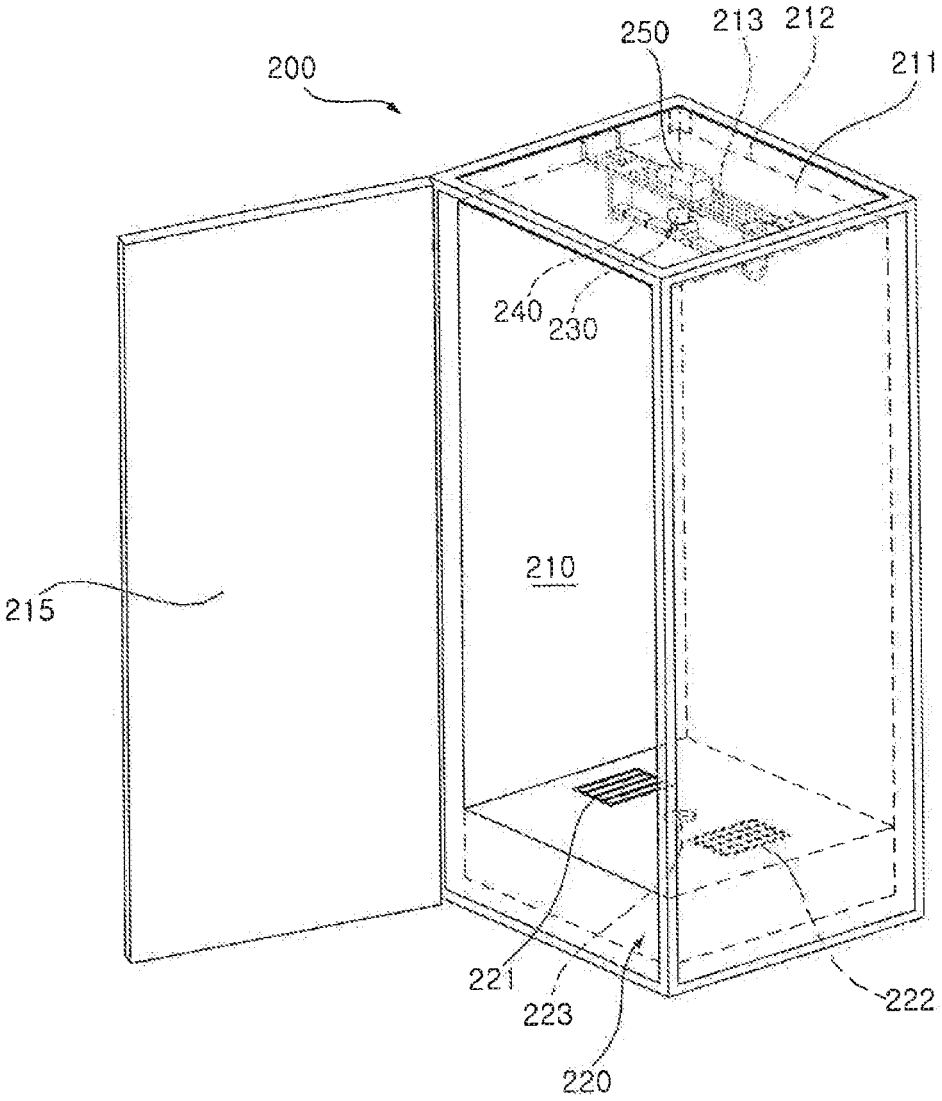
FIG. 6 illustrates a perspective view of a fabric treating apparatus according to another exemplary embodiment of the present invention.
Figure 7:
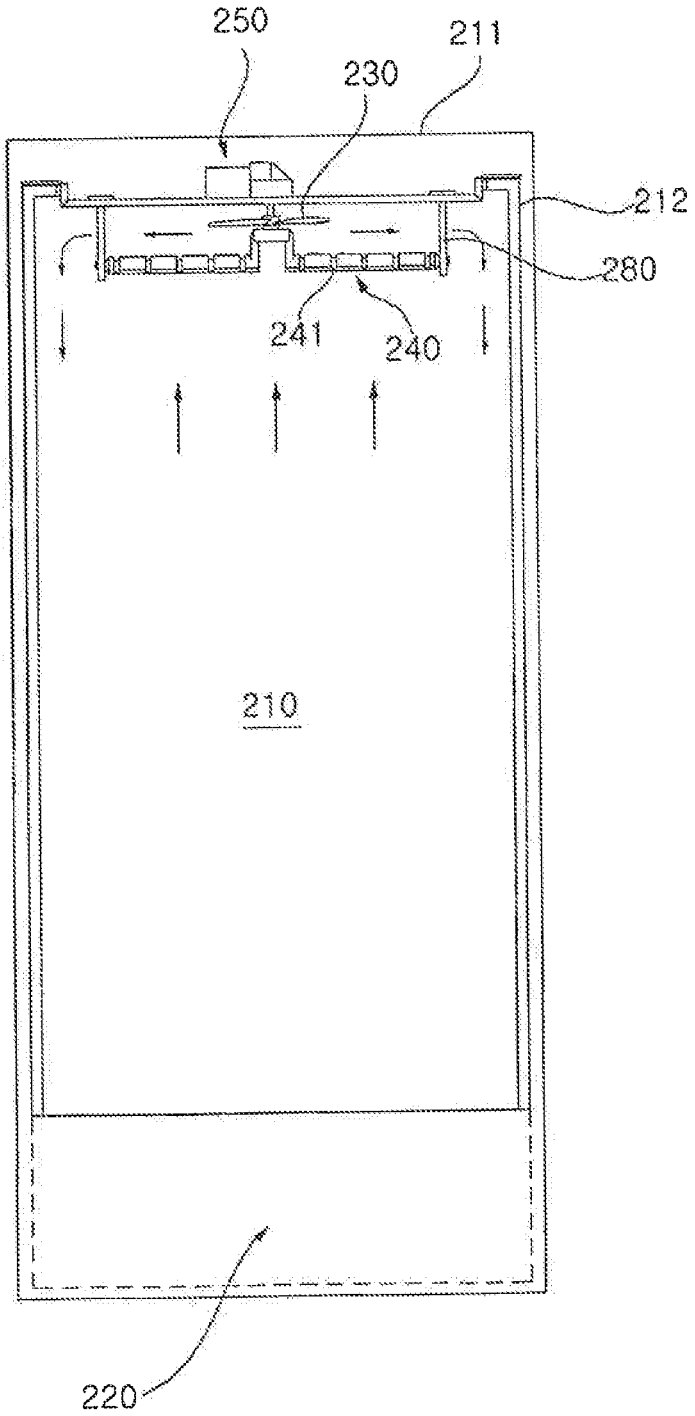
FIG. 7 illustrates a front view of a fabric treating apparatus according to another exemplary embodiment of the present invention.
Figure 8:
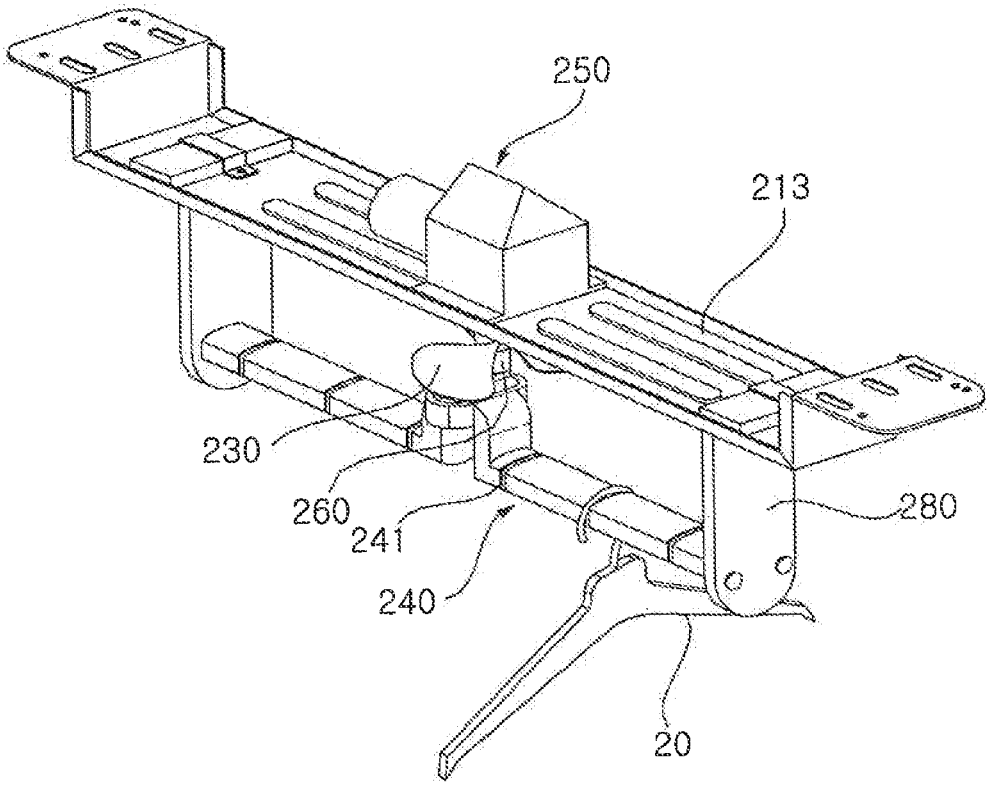
FIG. 8 illustrates a perspective view of main part of a fabric treating apparatus according to another exemplary embodiment of the present invention.

FIG. 6 illustrates a perspective view of a fabric treating apparatus 200 according to another exemplary embodiment of the present invention. FIG. 7 illustrates a front view of a fabric treating apparatus 200 according to another exemplary embodiment of the present invention. FIG. 8 illustrates a perspective view of main part of a fabric treating apparatus 200 according to another exemplary embodiment of the present invention. FIG. 9 illustrates an exploded perspective view of main part of a fabric treating apparatus 200 according to an exemplary embodiment of the present invention. Refer to FIG. 6 and FIG. 9 for further details.

A fabric treating apparatus 200 includes a treating chamber 210 in which the fabrics are carried, a heating unit 220 for supplying any one between hot wind and steam to the treating chamber 210, a hanger rack 240 disposed in the treating chamber 210, and a power unit 250 which generates and transmit the power for reciprocating the hanger rack 240. The power unit 250 is disposed upper part of a inner cabinet 212, and includes a driving unit 251 for generating rotary power outside the treating chamber 210, and a transmission unit for reciprocating the hanger rack 240 by transmitting the rotary power of the driving unit 251. The transmission unit includes a power transmission unit which transmits the rotary power of the driving unit 251, and a power transformation unit 260 which reciprocates the hanger rack 240 by converting the rotary power of the transmission unit.

The power transmission unit transmits the rotary power generated from the driving unit 251 to the power transformation unit 260. The power transmission unit transmits the rotary motion, and is variously embodied by those of ordinary skill in the scope of the present invention. The exemplary embodiment of the power transmission unit is explained for further details by the following.

The fabric treating apparatus 200 may further include a fan 230 which is rotated by the driving unit 251 and circulates air in the treating chamber 210.

An outside cabinet 211 forms the exterior of the fabric treating apparatus 200, and an inside cabinet 212 is disposed in the outside cabinet 211. The treating chamber 210 is disposed in the inside cabinet 212.

The treating chamber 210 is a space for treating a fabric to be changed the physical or chemical properties of the fabrics by supplying a steam or hot wind. Namely, the treating chamber 210 is a space for treating the fabrics by using various methods that the fabrics may be dried by using a hot wind, or that the wrinkles of the fabrics may be removed by using a steam, or that the fabrics may be supplied aroma by spraying an aromatic, or that the generation of static electricity of the fabrics may be prevented by spraying an antistatic.

The treating chamber 210 has an opening at the side, and thus, a fabric may be loaded in the treating chamber 210 through the opening. The opening side is opened by a door 215. If the door 215 is closed, the treating chamber 210 is isolated from the outside. If the door 215 is opened, the treating chamber 210 is exposed to the outside.

A heating unit 220 is disposed the bottom of the treating chamber 210. More specifically, the heating unit 220 is disposed between the outside cabinet 211 and the inside cabinet 212. The heating unit 220 is able to heat the air inhaled from the treating chamber 210, and to supply the hot wind to the inside of the treating chamber 210. Also, the heating unit 220 is able to generate a steam by heating the water, and to supply the steam to the inside of the treating chamber 210. Of course, the heating unit 220 is able to supply both the hot wind and the steam. Also, the heating unit 220 is able to supply any one between the hot wind and the steam. The heating unit 220 is variously embodied by those of ordinary skill in the scope of the present invention.

The heating unit 220 in accordance with an exemplary embodiment of the present invention includes an air inlet 221 for inhaling the air from the inside of the treating chamber 210, and a heater (not shown) for heating the air inhaled, and an outlet 222 for discharging the hot wind heated by the heater to the inside of the treating chamber 210, and an injection nozzle 223 for injecting a steam to the inside of the treating chamber 210.

The hot wind or the steam generated by the heating unit 220 supplies to the fabrics loaded in the treating chamber 210, and has an influence on the physical property or the chemical property of the fabrics. Namely, the hot wind or the steam makes the structure of the fabrics to be relaxed, so that the wrinkles of the fabrics may be removed. The steam reacts to the smell particles of the fabrics, so that an unpleasant smell may be removed. Also, the hot wind or the steam generated by the heating unit 220 has a sterilization effect on bacteria of the fabrics.

The hanger rack 240 which the hanger 200 is hung is disposed on the upper part of the treating chamber 210. Refer to the detailed reciprocating construction of the hanger rack 240 for further details.

The driving unit 251 is disposed the upper part of the outside of the treating chamber 210. The driving unit 251 is disposed between the inside cabinet 212 and the outside cabinet 211. The driving unit 251 may be built in motor frame 213 fixed between the inside cabinet 212 and the outside cabinet 211. The motor frame 213 fixes the driving unit 251 and absorbs the vibrations generated by the driving of the motor 251. *The motor frame 213 includes a plate 213a having a wall 213c for providing a ledge 213b on each side of the plate 213a. As shown in FIG. 7, the supporter 280 is closer to the ledge 213b than a center portion of the frame 213 along a width direction of the inside cabinet 212.*

Large amount of fabrics may be treated by making enough space because the driving unit 251 is disposed outside of the treating chamber 210. Also if the driving unit 251 is disposed side of the treating chamber 210, the width of the fabrics treating apparatus 200 is extended, thus the fabrics treating apparatus 200 of the present invention has an advantage to have slim shape by disposing upper part of the inside cabinet 212. The fabrics treating apparatus 200 may be easily installed at the narrow space such as indoor by the slim shape. Also there is an advantage to increase the amount of the fabrics to treat by the enlargement of the inner space of the treating chamber 210 because of installing the driving unit 251 by using the upper part of the outside of the treating chamber 210.

The driving unit 251 reciprocates not only the hanger rack 240 but the also the fan 230. Therefore it has an effect that the design process and the production process are simplized because extra driving unit for rotating the fan 230 does not need.

The power transformation unit 260 is a kind of the connecting rod which reciprocates the hanger rack 240 by transforming the rotary motion generated by the driving unit 251. As one end of the power transformation unit 260 is connected to the power transmission unit, the power transformation unit 260 receives the rotary power generated by the driving unit 251. Another end of the power transformation unit 260 is inserted in the slot 242 of the hanger rack 240. Refer to the detailed construction of the power transformation unit 260 for further details.

The hanger rack 240 may include a hanger slot 241 on which a hanger [200] *20* is hung, and a slot 242 which is disposed at the middle. The hanger rack 240 reciprocates with being hung on the upper part of the treating chamber 210. Both sides of the hanger rack 240 may be connected to the inner cabinet 212 which constitutes the upper face of the treating chamber or to the motor frame 213 by each supporter 280.

The supporter 280 includes an elastic material so that the hanger rack 240 can reciprocate smoothly. Specially, the supporter 280 is a long plate which is formed to the direction of back and forth to limit the reciprocating motion of the hanger rack 240 from front to back. One end of the supporter 280 is fixed at the motor frame 213 or the inner cabinet 212, and another end is combined to the one side of the hanger rack 240.

The fan 230 rotates by receiving the rotary power generated by the driving unit 251. It is desirable for the fan 230 to be disposed upper part of the treating chamber 210. The hot wind or the steam supplied into the treating chamber 210 by the heating unit 220 rises upward in the treating chamber 210, and circulates in the treating chamber 210 blown by the fan 230.

The fan 230 may be embodied by the cross flow fan which blows the hot wind or the steam which is discharged from the heating unit 220 and is raised to the side direction. The cross flow fan is variously embodied by those of ordinary skill in the scope of the present invention.

The hot wind supplied by the heating unit 220 is moisturized as drying the fabrics in the treating chamber 210. The moisturized hot wind flows upward in the treating chamber 210, and is condensed as contacting to the inner wall of the treating chamber 210.

Specially, the condensation on the inner wall of the inside cabinet 212 gets stronger when the steam is supplied to the treating room 210 by the heating unit 220. If the condensed water is left after the fabrics treating apparatus working, the apparatus may have the problems because of the unsanitary conditions that the bad smell and the bacteria are generated. The fan 230 prevents forming the condensed water by circulating the air inside of the treating chamber 210, and maintains the cleanness of the inside of the treating chamber 210.

When the fabrics treating apparatus is not operated for a long time, the fan 230 is operated intermittently by automatically or manually for the air in the treating chamber 210 so as to be ventilated or dried.

The air in the treating chamber 210 may flow uniformly by the fan 230, the fabrics in the treating chamber 210 may be treated effectively by supplying the hot wind or the steam uniformly.

Refer FIG. 9, the power unit 250 includes the driving unit 251 which generates the rotary power, and the power transmission unit which transmits the rotary power generated by the driving unit 251 to the power transformation unit 260. The power transmission unit may include the driving pulley 252 rotated by the driving unit 251, the driven pulley 252 rotated by the belt 253 which connects the driving pulley 252, and the rotary shaft 255 inserted into the driven pulley 254 and rotated by the driven pulley 254.

According to an exemplary embodiment, the diameter of the driven pulley 254 is larger than the diameter of the driving pulley 252. The driving pulley 252 rotates with comparatively high speed because of receiving the rotary power directly. If the hanger rack 240 reciprocates same cycle with the rotation cycle generated by the driving unit 251, transient vibration is generated and the driving unit 251 is overloaded, and the efficiency of the hanger rack 240 for treating fabrics is decreased. Therefore, it is desirable to control the reciprocating cycle of the hanger rack 240, through the diameter of the driven pulley 254 is larger than the diameter of the driving pulley 252. The adequate range of the diameter ratio between the driving pulley 252 and the driven pulley 254 is from 1:15 to 1:5.

The power transmission unit may include a driving sprocket, a driven sprocket, and a chain, instead of said driving pulley 252, said driven pulley 254 and said belt 253. And besides, the power transmission unit may include a driving gear, a driven gear, a belt, and so on. Thus, the power transmission unit may be variously embodied.

Also, the fabric treating apparatus 200 may further include a bearing unit which is inserted into the rotary shaft 255. The bearing unit may include the bearing housing 257, and a bearing 256 which is disposed between the rotary shaft 255 and the inside of the bearing housing 257. The bearing unit supports the rotary shaft 255 by being fixed at a motor frame 213, and makes the rotary shaft 255 rotate smoothly.

It is desirable for the bearing 256 to be an oilless bearing so as not to pollute the fabrics in the treating chamber 210.

The power transformation unit 260 transforms rotary motion received from the power transmission unit 251 into reciprocating motion of the hanger rack 240. The power transformation unit 260 includes a rotary shaft connector 261 which is connected to the rotary shaft 255, a rotary arm 262 which is extended from the rotary shaft connector 261, and a slot connector 263 which is inserted to the slot 242 of the hanger rack 240 and rotates the rotary shaft 255 as projected from the end of the rotary arm 262.

The rotary shaft connector 261 is disposed at the end of the power transformation unit 260, and is connected to the rotary shaft 255. It is desirable for the rotary arm 262 to be extended through the perpendicular direction with the rotary shaft 255 at the rotary shaft connector 261. The slot connector 263 rotates with fixed radius from the rotary shaft 255 as the rotary shaft 255 rotates. If the rotary arm 262 is disposed perpendicular to the rotary shaft 255, the fixed radius would be the length of the rotary arm 262.

It is desirable for the slot 242 to be disposed long with the perpendicular direction to the moving direction of the hanger rack 240. As the reciprocating direction of the hanger rack 240 is the right and left direction, it is explained that the slot is disposed long with the back and forth direction to the following. As the slot 242 is disposed long with the back and forth direction, the movement with back and forth direction is counterbalanced by the slot 242 and the hanger rack 240 reciprocates to the right and left direction, when the slot connector 263 rotates the rotary shaft 255 with being inserted into the slot 242 movement.

The water may be collected into the slot 242, as the moisture of the humid air in the treating chamber 210 is condensed. Therefore it is desirable for the drain hole (not shown) to be disposed at the slot 242 for the collected water to drain outside the slot 242.

It is possible for the hanger rack 240 to include a guide instead of the slot 242. It is possible for the guide to make the hanger rack 240 reciprocate by the pushing and pulling force of the power transformation unit 260, as the guide which is made of the rib or the projection differently with an exemplar embodiment of the present invention.

The fan 230 rotates as connecting to the power transmission unit or the power transformation unit 260. According to an exemplary embodiment of the present invention, the fan 230 is connected to the rotary shaft connector 261 of the power transformation 260. But it is possible for the fan 230 to be connected to the rotary shaft 255.

Figure 10:
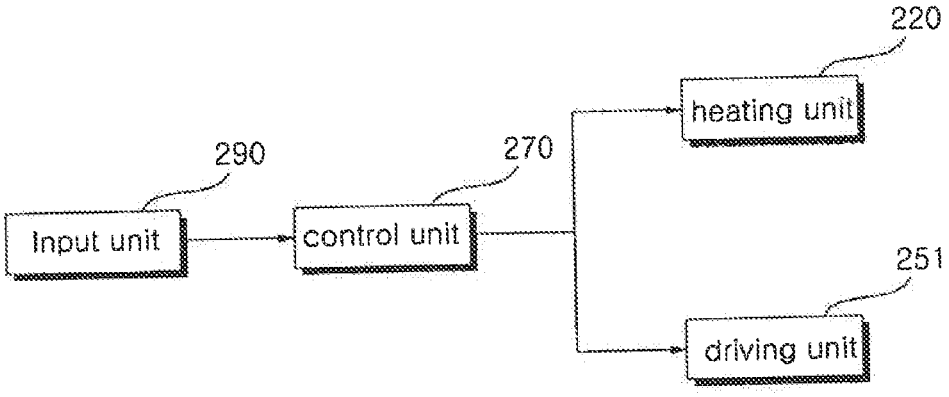
FIG. 10 illustrates a block diagram of the approximate construction of the fabric treating apparatus according to another exemplary embodiment of the present invention.

FIG. 10 illustrates a block diagram of the approximate construction of the fabric treating apparatus 200 according to another exemplary embodiment of the present invention. Refer to FIG. 10, the fabric treating apparatus 200 may further include the heating unit 220 and a control unit 270 which controls the driving unit 251. The control unit 270 may be embodied so as to control not only the heating unit 220 or the driving unit 251 but also the whole operations of the fabric treating apparatus 200.

The control unit 270 may control at least one of the heating unit 220 and the driving unit 251. If the operating command is inputted into an input unit 290, the control unit 270 may control both the heating unit 220 and the driving unit 251 to be operated simultaneously. For example, the heating unit 220 and the driving unit 251 may be controlled to be operated simultaneously by the control unit 270, in case that the amount of the fabric to be treated is large, or the fabrics are soaked, or the fabrics need to be treated rapidly.

In the case that the amount of the fabric to be treated is small, or the fabrics get slightly wet, or the power consumption is reduced, or the noise is reduced at night, it may be controlled so that one of the heating unit 220 and the driving unit 251 may be operated. Specially, in the case that the bad smell or the moisture in the treating chamber 210 is removed, the control unit 270 may control for the only driving unit 251 to be operated and for the fan 230 to rotate in order to reduce the power consumption by the heating unit 220. If users input the self cleaning through the input unit 290, the control unit 270 controls for the driving unit 251 to be operated and for the fan 230 to rotate, thus the air inside of the treating chamber 210 may be deodorized or dried.

The fabric treating apparatus 200 may further include a humidity sensor (not shown) which measures the humidity of the treating chamber 210. if the humidity of the treating chamber is measured by the humidity sensor, the control unit 270 may control for the one of the heating unit 220 and the driving unit 251 so as to be operated based on the measured results.

If the measured value of the humidity sensor is higher than the required value, the control unit 270 controls for both the heating unit 220 and the driving unit 251 to be operated. But if the measured valued of the humidity sensor is lower than the required value, the control unit 270 controls for one of the heating unit or the driving unit 251 to be operated.

When the steam is supplied into the treating chamber 210 by the heating unit 220, the control unit 270 may control for the driving unit 251 to be operated. The control unit 270 operates the driving unit 251 so as to rotate the fan 230, in order to prevent the condensed moisture from sticking to the inside of the inner cabinet 212. If the fabrics is left in the treating chamber 210 after supplying the steam to the fabrics, the condensed water can pollute the fabrics as the condensed water drops to the fabrics. It has an effect that the fan prevents the condensed water from being generated.

Also, a fabric treating apparatus according to the present invention is possible to improve space utilization of a treating chamber by disposing a driving unit for the upper part of the outside of a treating chamber.

Also, a fabric treating apparatus according to the present invention is possible to minimize the install space by reducing the width of the apparatus.

Also, a fabric treating apparatus according to the present invention is possible to increase the amount of the fabrics to treat by the enlargement of the inner space of the treating chamber.

Also, a fabric treating apparatus according to the present invention includes the hanger unit swings the fabrics are hung in the hanger rod by reciprocating. It is possible to remove the wrinkles of the fabrics effectively.

Also, a fabric treating apparatus according to the present invention includes a fan which circulates an air inside of the treating chamber. It is possible to increase an efficiency of the drying.

Also, a fabric treating apparatus according to the present invention includes a fan is rotated by the driving unit which reciprocates a hanger unit. Thus, it is unnecessary an additional driving means for rotating a fan.

Also, a fabric treating apparatus according to the present invention is possible to make uniform air flow inside of the treating chamber by circulating air in the treating chamber.

Also, a fabric treating apparatus according to the present invention is possible to prevent generation of the dead space that a hot wind and steam cannot be supplied.

Also, a fabric treating apparatus according to the present invention is possible to prevent that condensing water form on the inside of the treating chamber.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A fabric treating apparatus comprising:

an inside cabinet which forms a treating chamber in which fabrics are treated;

a heater to supply any one of hot air and steam to the treating chamber;

a hanger rack disposed in the treating chamber;

a driver to generate rotary power, disposed outside of the treating chamber and on an upper part of the inside cabinet;

a transmission for reciprocating the hanger rack by transmitting the rotary power of the driver; and a supporter which supports both sides of the hanger rack and includes an elastic material.

wherein the transmission is disposed to penetrate the inside cabinet, wherein the transmission includes a power transmission unit which transmits the rotary power of the driver; and a power transformation unit which reciprocates the hanger rack by converting the rotary power of the transmission, wherein the hanger rack includes a slot for coupling with an end of the power transformation unit, wherein the slot is disposed at the middle of the hanger rack.

2. The fabric treating apparatus of claim 1, wherein the power transmission unit includes a rotary shaft which penetrates the inside cabinet and the power transformation unit includes:

a rotary shaft connector which is coupled to the rotary shaft;

a rotary arm which extends from the rotary shaft connector;

a slot connector that projects from an end of the rotary arm, and rotates with respect to the rotary shaft and is inserted into the slot.

3. The fabric treating apparatus of claim 1, wherein the slot is perpendicular to the moving direction of the hanger rack, and perpendicular to the reciprocating direction of the hanger rod.

[4. The fabric treating apparatus of claim 1, wherein the hanger rack includes a guide which guides the hanger rack that is powered by the power transformation unit.]

5. The fabric treating apparatus of claim 2, wherein the slot connector includes a projection which extends from the rotary arm; and a shock absorber in which the projection is inserted.

6. The fabric treating apparatus of claim 5, wherein the shock absorber is an elastic material.

7. The fabric treating apparatus of claim 5, wherein the slot connector further includes a bearing located between the projection and the shock absorber.

8. The fabric treating apparatus of claim 7, wherein the bearing is an oilless bearing.

9. The fabric treating apparatus of claim 1, wherein the power transmission unit includes:

a driving pulley rotated by the driver;

a driven pulley coupled to the driving pulley;

a belt coupling the driving pulley and the driven pulley; and a rotary shaft rotated by the driven pulley.

10. The fabric treating apparatus of claim 9, wherein the diameter of the driven pulley is larger than the diameter of the driving pulley.

11. The fabric treating apparatus of claim 9, further including a bearing unit which includes a bearing in which the rotary shaft is coupled.

12. The fabric treating apparatus of claim 1, wherein the power transmission unit includes:

a driving sprocket rotated by the driver;

a driven sprocket coupled with the driving sprocket;

a chain coupling the driving sprocket and the driven sprocket; and a rotary shaft rotated by the driven sprocket.

13. The fabric treating apparatus of claim 1, wherein the power transmission unit includes:

a driving gear driven by the driver;

a driven gear coupled with the driving gear;

a belt including gear teeth coupling the driving gear and the driven gear; and a rotary shaft rotated by the driven gear.

14. The fabric treating apparatus of claim 1, wherein the supporter is a long plate formed to limit the front and back reciprocating motion of the hanger rack.

15. The fabric treating apparatus of claim 1, further including a fan rotated by the driver wherein the fan circulates air in the treating chamber.

16. The fabric treating apparatus of claim 15, wherein the fan sends air to the side direction.

17. The fabric treating apparatus of claim 15, wherein the fan rotate s if the steam is supplied inside of the treating chamber by the heater.

18. The fabric treating apparatus of claim 15, wherein the fan circulates air in the treating chamber to make uniform air flow inside of the treating chamber.

19. The fabric treating apparatus of claim 1, further including a fan rotated by the driver and coupled either to the power transmission unit or the power transformation unit, wherein the fan circulates air in the treating chamber.

*20. The fabric apparatus of claim 1, wherein the slot is provided by a groove of a prescribed shape.*

*21. The fabric treating apparatus of claim 1, wherein the slot has an oblong shape.*

*22. The fabric treating apparatus of claim 1, wherein the power transmission unit includes a connector which protrudes into the slot.*

*23. The fabric treating apparatus of claim 22, wherein the connector remains inside the slot as the hanger rack reciprocates side to side.*

*24. The fabric treating apparatus of claim 23, wherein the connector follows along a side surface of the slot as the hanger rack reciprocates side to side.*

*25. The fabric treating apparatus of claim 1, further comprising an outer cabinet and a frame provided between the inside cabinet and the outer cabinet, the frame includes a plate contacting the inside cabinet and a ledge positioned above the plate.*

*26. The fabric treating apparatus of claim 25, wherein the frame includes an inverted U shaped portion to provide the ledge.*

*27. The fabric treating apparatus of claim 25, wherein the supporter is coupled to the ledge.*

*28. The fabric treating apparatus of claim 25, wherein the driver is fixed to the plate.*

*29. The fabric treating apparatus of claim 25, wherein the plate has a wall for providing the ledge on each side of the plate.*

*30. The fabric treating apparatus of claim 29, wherein the driver and the supporter are coupled to the plate.*

*31. The fabric treating apparatus of claim 25, wherein the driver includes a motor coupled to the plate.*

*32. The fabric treating apparatus of claim 25, wherein the frame extends along a width direction of the inside cabinet.*

*33. The fabric treating apparatus of claim 25, wherein the supporter connects the hanger rack and the frame, and wherein an end of the supporter extends below the ledge and the plate.*

*34. The fabric treating apparatus of claim 25, wherein the supporter is closest to the ledge than a center portion of the frame along a width direction of the inside cabinet.*

*35. The fabric treating apparatus of claim 1, wherein the slot is provided by an opening of a prescribed shape.*

*36. The fabric treating apparatus of claim 35, wherein the opening has an oblong shape.*

*37. The fabric treating apparatus of claim 26, wherein the driver is fixed to the plate, and the supporter is coupled to the ledge.*

* * * * *